(12) United States Patent
Edwards

(10) Patent No.: US 9,181,932 B2
(45) Date of Patent: Nov. 10, 2015

(54) OTEC COLD WATER RETRIEVAL AND DESALINATION SYSTEMS

(75) Inventor: Douglas Edwards, Sussex (GB)

(73) Assignee: RE SYSTEMS LTD., Sussex (GB)

( * ) Notice: Subject to any disclaimer, the term of this patent is extended or adjusted under 35 U.S.C. 154(b) by 132 days.

(21) Appl. No.: 14/008,132

(22) PCT Filed: Mar. 30, 2012

(86) PCT No.: PCT/GB2012/000328
§ 371 (c)(1),
(2), (4) Date: Sep. 27, 2013

(87) PCT Pub. No.: WO2012/136967
PCT Pub. Date: Oct. 11, 2012

(65) Prior Publication Data
US 2014/0014199 A1    Jan. 16, 2014

(30) Foreign Application Priority Data

Apr. 5, 2011 (GB) .................................. 1105738.7
Oct. 27, 2011 (GB) .................................. 1118550.1

(51) Int. Cl.
*F03G 7/05* (2006.01)
*F03C 1/00* (2006.01)
*B63B 35/44* (2006.01)

(52) U.S. Cl.
CPC ........... *F03G 7/05* (2013.01); *B63B 2035/4433* (2013.01); *Y02E 10/34* (2013.01); *Y10T 137/6966* (2015.04)

(58) Field of Classification Search
CPC .... F03G 7/05; B63B 2035/4433; Y02E 10/34
USPC ............................ 60/641.6, 641.7, 495–496
See application file for complete search history.

(56) References Cited

U.S. PATENT DOCUMENTS

| 1,406,036 | A |   | 2/1922  | Lake |
| 1,413,930 | A |   | 4/1922  | Orr et al. |
| 1,765,539 | A |   | 6/1930  | Stinson |
| 1,868,219 | A |   | 7/1932  | Parker |
| 3,896,622 | A | * | 7/1975  | Daniello .................... 60/641.7 |
| 4,456,119 | A |   | 6/1984  | in't Hout et al. |
| 4,781,029 | A | * | 11/1988 | SerVaas ..................... 60/641.7 |
| 5,408,889 | A |   | 4/1995  | Parault |
| 5,582,691 | A | * | 12/1996 | Flynn et al. ................ 203/11 |
| 8,117,843 | B2 | * | 2/2012 | Howard et al. .............. 60/641.7 |
| 8,146,362 | B2 | * | 4/2012 | Howard et al. .............. 60/641.7 |

(Continued)

FOREIGN PATENT DOCUMENTS

| EP | 0002829 A1 | 7/1979 |
| GB | 2324120 A  | 10/1998 |

(Continued)

*Primary Examiner* — Hoang Nguyen
(74) *Attorney, Agent, or Firm* — Hayes Soloway PC

(57) ABSTRACT

A system for raising water for OTEC and desalination is provided. The system includes at least one submerged platform positioned within a body of water, wherein the at least one submerged platform is buoyantly held up from a bottom surface of the body of water, and wherein the at least one submerged platform is held below a top surface of the body of water by at least one mooring attached to the bottom surface of the body of water. At least one cable is movably connected to the at least one submerged platform. At least one container is held by the at least one cable, wherein a quantity of water is emptied from the at least one container.

20 Claims, 11 Drawing Sheets

(56) References Cited

U.S. PATENT DOCUMENTS

2004/0173035 A1 9/2004 Britt
2007/0289303 A1* 12/2007 Prueitt .................. 60/641.7
2009/0077969 A1* 3/2009 Prueitt .................. 60/641.7

FOREIGN PATENT DOCUMENTS

| | | |
|---|---|---|
| JP | S52156246 A | 12/1977 |
| NL | 7907951 A | 6/1981 |

* cited by examiner

US 9,181,932 B2

OTEC COLD WATER RETRIEVAL AND DESALINATION SYSTEMS

CROSS REFERENCE TO RELATED APPLICATION

This application claims benefit of International Application No. PCT/GB2012/000328 filed Mar. 30, 2012, which claims the benefits of GB Application No. 1105738.7 filed Apr. 5, 2011, now abandoned, GB Application No. 1118550.1 filed Oct. 27, 2011, now GB Patent No. 2489765, the entire disclosures of which are incorporated herein by reference.

FIELD OF THE DISCLOSURE

The present disclosure is generally related to ocean thermal energy conversion (OTEC) systems and more particularly is related to OTEC cold water retrieval & desalination systems.

BACKGROUND OF THE DISCLOSURE

At present, ocean thermal energy conversion (OTEC) uses a cold water pipe to draw cold water from the deep sea, the pipe must either lie on the sea bed which is generally at least 5 miles from the land or it must be suspended. The OTEC pipe is so risky and expensive that OTEC is not commercially viable except in very ideal situations. OTEC uses the thermal difference between the warm tropical water and the cold sea water generally at least 1000 meters beneath the sea. The cold water is used in the condenser of a heat engine. The air conditioning industry also can utilize the cold water in the deep sea and it can also be used in mariculture and low temperature thermal desalination.

Thus the delivery of the cold water can be used in several different ways, and the way in which it is used and the proximity to the shore will determine the best method of importing the water. OTEC, low temperature desalination, and hydrogen production can be achieved at sea, or on land, the use of cold water in air conditioning requires for the water to be transported back to shore in most cases.

Thus, a heretofore unaddressed need exists in the industry to address the aforementioned deficiencies and inadequacies.

SUMMARY OF THE DISCLOSURE

Embodiments of the present disclosure provide a system and method for raising water. Briefly described, in architecture, one embodiment of the system, among others, can be implemented as follows. At least one submerged platform is positioned within a body of water, wherein the at least one submerged platform is buoyantly held up from a bottom surface of the body of water, and wherein the at least one submerged platform is held below a top surface of the body of water by at least one mooring attached to the bottom surface of the body of water. At least one cable is movably connected to the at least one submerged platform. At least one container is held by the at least one cable, wherein a quantity of water is emptied from the at least one container.

The present disclosure can also be viewed as providing an ocean thermal energy conversion (OTEC) system. Briefly described, in architecture, one embodiment of the system, among others, can be implemented as follows. The OTEC system includes at least one OTEC apparatus. At least one container is supplying a quantity of cold water to the OTEC apparatus, wherein the at least one container is attached to at least one loop of a cable, wherein the cable is driven in a single direction.

The present disclosure can also be viewed as providing low temperature thermal desalination (LTTD) system. Briefly described, in architecture, one embodiment of the system, among others, can be implemented as follows. The LTTD system includes at least one LTTD apparatus. At least one container is supplying a quantity of cold water to the LTTD apparatus, wherein the at least one container is attached to at least one loop of a cable, wherein the cable is driven in a single direction.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
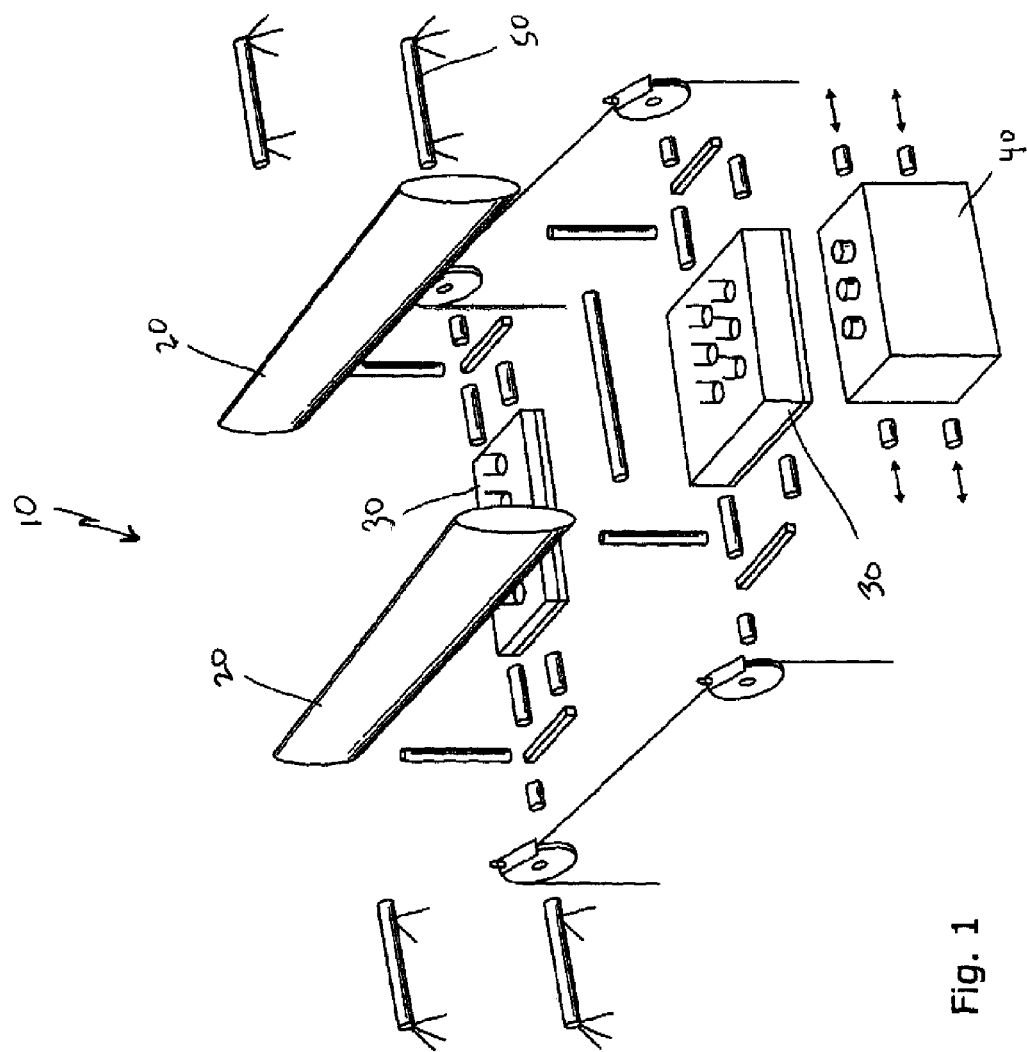
FIG. 1 is an exploded view of a system for raising water for use with an ocean thermal energy conversion system, in accordance with a first exemplary embodiment of the present disclosure.

A cable system may use streamlined containers to draw in cold water from the sea bottom. There are numerous design challenges associated with the new cable driven cold water retrieval system. For example, the containers would have to be very large to serve commercial OTEC and so a large boat would be required to support the container with the top structure, and would have to pump the water through air increasing the amount of work required significantly and so the cold water must be delivered underwater to its destination.

The energy consumption of the cable system might take too much power without the use of energy saving concepts. Lifting the cold water out of the water would require that cables were much stronger than if the container is left in the water. The emptying and filling of a single container might take too long and so a method of delivery water consistently and quickly is essential. The use of high speed pumping would waste energy and so a means of filling and emptying the container rapidly without the use of electricity is disclosed.

The use of cables with bags held in cages can draw in the cold water and then be pulled up by the cable a cable system can have many bags on each cable. The weight of the cold water is only slightly heavier than the surface water and so the cables must not be very strong to lift very large quantities of water to the surface.

The top structure may be a floating structure with a submerged adjoining structure and with the expensive components on a boat. In the interest of economy and storm damage prevention the top structure can be a mixture of permanent and semi-permanent structures. The containers required to supply commercial amounts of water are very large and so an unnecessarily large boat or floating platform would be required to manage these containers. 'Air lift bags' or foam filled modules are durable and cheap compared to a boat, and can hold large weights. They can also be held in the ocean for long periods of time including storms and their loss would be negligible compared to the loss of a platform and they also constitute a much lower initial capital investment. Unlike a buoyant boat they can also be sunk or even permanently held below the water line so that they are permanently exerting a lifting force when the cable is held at the bottom creating a cable system that does not bob up and down.

The use of containers which can be dragged through the water with open doors will fill with water as they are pulled through the water eliminating the need for pumping, the containers are not necessarily empty or full it is more that water is replaced as the container is dragged through the water. The patent describes various innovations aimed at reducing pumping expenses lowering the parasitic consumption so that the OTEC system will be more productive and reducing the top structure by using modules rather than a boat or oil rig to hold the cables so that the risk of damage or loss of the cold water system is minimal.

A description of features, components, and concepts with the present disclosure are provided herein:

Diving Container

The diving container is held to the cables and is responsible for collecting cold water. Its preferred features include a rigid container with at least one side which can contract, or a rigid container with a membrane inside so that it can fill with at least one of surface sea water brine or waste cold water during emptying. A bag or bag with cage held to the cables or two bags held in a cage one for filling with waste water whilst the other empties of new cold water. A rigid container must either be fitted with a movable section like a syringe or be fitted with vacuum-prevention device, such as a snorkel, so that it does not form a vacuum at the surface, if the container is fitted with a movable section this section can act like a syringe but may or may not include a piston, and may or may not constitute a side of the container i.e. this movable section can be held and supported within a rigid container rather than acting as one of its sides. The container would open doors and fill, by being dragged though the water or open the doors and then drive the membrane to fill. If the container is a bag it can simply open the doors and fill the bag by driving it through the water. The bag would fill and open as it passed through the water.

Insulation can be polystyrene aerogel or fiberglass or a ceramic material. A sliding door on at least one end and a rack and pinion gear to the open door by simply opening the doors of the container the diving module will fill with cold water especially if the container is in motion. With doors at each end and with the container in motion the container would flush out its contents and be filled with new cold water, the doors would then close and the container would return to the surface. The containers weight will be neutralized by the poly styrene insulation.

The container can be fitted with valves or sliding doors at least one end of the container, the use of sliding door will allow more water to enter quickly; alternatively sea water pumps could drive the membrane back and forth or fill the bag, or the membrane would be brine sucking in water through one way valves rather than doors.

Brine and Cold Water Waste Disposal

The container can include the feature of a thoroughly insulated membrane which can move back and forth inside the container so that the container can fill with brine and/or waste Coldwater at the same time as it is emptying new cold water. This membrane can act as a pump and may be driven by a rack and pinion gear and a motor this membrane can facilitate the filling or the container at the bottom and at least partially contribute to the emptying of the container at the surface. The brine and waste cold water are denser than the surrounding water and so their effect would be to reduce the parasitic energy consumption. Brine waste will only be generated by an OTEC system which is desalinating or by an low temperature thermal desalination system. Brine from an external source can be added if it is convenient and could potentially eliminate all of the parasitic costs of the OTEC cable system.

Surface Container

A container into which the cold water is placed ready for export either into an OTEC condenser on a boat or back to shore for use onshore. This container acts as a joint between the diving containers the cable and their buoyant support and the boat containing the remaining OTEC components and is held under water. This surface container can be held by buoyancy and tethered to the sea bottom. The use of the surface container will minimize the size of the boat required.

This surface container can be held on a platform under the water the containers can be pulled directly up and into it or pulled into it from the side. The surface container can be a bag or a rigid container with a membrane.

Sub Surface Platform

Rather than using a surface container a submerged platform holds the cables and wheels and an extractor, the diving container is pulled into the extractor and the extractor is either fitted with pumps or the diving container drives the cold water out using the motorized membrane. The cold water is passed to shore or up to a boat or platform with the use of hoses. The platform is either held from the bottom of a boat or platform, or works in the same way a tension leg wherein the platform is buoyant but tethered to the seabed so that it is suspended under the sea surface where the wave are much less powerful than at the surface. If the platform is like a tension leg and is joined to a ship it can detach from the ship so that the ship can either return to port or detach form the platform for safety.

Fully Sealed Buoyant Bag/Module Acting as Buoyant Support Means for the Cable System and Surface Container A 'fully sealed' industrial strength 'air lift bag' container which is this case can contain any buoyant liquid, gas or foam (e.g. poly styrene). The buoyancy can also be made from large amounts of poly styrene held in a plastic casing, the purpose of the buoyancy held in module container is to provide a low cost support for the cable structure, the cables can be driven by a motor whose power can be taken from the electricity produced by the OTEC turbine or from a nearby renewable energy source like wind, or wave power if the system is not being used for OTEC or from a power cable leading from the shore.

Insertion Extraction System 1

The container is driven into the extractor. The extractor case is fitted over the pipe box, syringe container or bag using male to female fittings, small check valves allow the water which would compress or pollute the cold water between the male and female fitting to leave. The extractor case can be fitted with a collapsible tank on top with insulation. The location of the extractor could be to the side of the container or at the top.

Hoses or pipes connected to the extractor case take the cold water to the OTEC, air conditioning or desalination system. Other hoses or pipes can be connected to place waste cold water or brine into the pipe box.

Insertion Extraction System 2

A Cable draws a container into the extractor case with male and female sockets, the container disconnects and then the cable then continues moving. The container is either held in place by clips or levers or it uses wings which are held between at least one pair of wheels.

Extraction System 3

Once gripped by the wheels a movable extractor is placed underneath the container, and the fluid within the container is drawn from top to bottom. In the case of a two way system the containers are pulled up into an extractor are emptied and then descend, in the case of a one way system the container is pulled into an extractor the container detaches from the cable and is emptied, whilst it is emptying the container and the extractor move across the platform along a rail held on the submerged platform. The extractor and container move across to the descending side of the cable, the container is then placed onto the cables. Once detached from the container the extractor moves back to the ascending side ready to receive a new container filled with new cold water. There can be more than two containers on a one way system.

Male or Female Fittings

Male or female fittings connect the diving module to the surface container the purpose of these fittings is to create a seal so that the Coldwater can be transferred from the diving container to the surface container without contaminating the cold water with warmer surface water. Alternatively the nose of the diving container fits inside the surface container making a large male and female join. The nose of the container can then be streamlined with the doors opening from the nose of the streamlined front.

Command and Power Cable

To provide power to the diving container and to issue commands to the container so that it can open its doors and attach and detach from the cable with the use of a motorized gripping mechanism.

Boat

In the case of OTEC including OTEC desalination a boat will hold the main components of the OTEC system so that in the event of a storm the expensive components will not have to endure the storm. A pump held in the boat pumps the cold water from the surface container for use in the condenser and can pump the brine and the cold water back into the top of a diving container.

Shore Based Use of Cold Water

If the water is being used on shore then the cold water can travel back to shore along an insulated surface pipe or along a cable system with rails. The insulation in the diving containers will be sufficient for them to travel all of the way back to shore. If the cable system is being used onshore rather than traveling straight up it can travel diagonally until it is much closer to shore avoiding the warm surface water.

A One Way Continuous Cable System

A one way continuous cable system sends all of the containers in one direction this type of system must have a bottom wheel to hold the cables and the diving container must be allowed to pass around the bottom wheel in the same way as a ski lift, lake a ski lift (funttelle) the container can detach from the cables and empty to allow the cable system to remain in motion this will allow for there to be more than two containers on one cable.

A Two Way System

A two way system sends the diving container back and forth along the same route, the modules are suspended in the water although the system can be attached to a bottom wheel so that there is tension in the cables but the diving containers will not pass around it. The two-way system can have a single cable with a single container or two containers one on each end of a single rope a pair of ropes or multiple ropes can be used. The container can simply pass up and down and can be pulled directly into an extractor, either the container uses the movable membrane to empty the contents of the container or if the container is a bag a pump can be fitted onto the extractor so that the liquid is sucked from the bag.

Pipe Box

An insulated container which holds pipes within it, this is so that the cold water can be sucked from it without extending warm pipes into the cold container. This is also intended to act as a support for the moving membrane and so that water can be sucked out of a container from its bottom even if the extractor is at the top, in the case of a container which has a moveable membrane this will be essential if the extractor is to be held above the diving container, which is the best location for the container as it would than not need to move out of the way of the diving container.

Wings

All types of system will use wings fitted to the outside of the container which pass into at least one pair of wheels these wheels grip the container and. The wheels are place sufficiently close together to apply a large enough force to trap the wing; the wheels can accelerate and decelerate the container as they are motorized. Each pair of wheels can move at a slightly different speed so that the container is gradually accelerated or decelerated. Alternatively the wheels are able to open and close the distance between one another, and are able to do this synchronously with the deceleration of the container. The wings can be coated with rubber so that there is good grip between the wings and the wheels.

Contracting Walls

The container is pulled up between at least one pair of sheets these walls then close around the container to hold it in place. Preferably the sheet will allow the cable to continue moving once the container is detached from the cables.

Container with Check Valves and Pumps

A container with at least one pump at one end and at one check valve; water is pumped in and due to the increase in pressure and water is forced out the through the check valve Container/Check Valve/Membrane/Pump A container with a movable membrane draws in sea water from one side which forces the sea water or brine out through the check valve.

Giant Syringe Container

A giant syringe container which can open the membrane end so that water can fill the 'syringe' easily or a container which can simply act like a syringe the motor drives a giant piston whose weight can be neutralized, the piston draws in water, or dense liquid using a motor and drives water or dense liquid out using a motor.

A Double Layered Container with Two Layers of Insulation

A container inside a container, the inner container holds the cold water for extraction and it is insulated, a second layer of cold water surrounds this insulation and another container is placed around this container and is also insulated, should the first layer warm up the second layer will remain cold this is preferable the contents of the inner container being contaminate with any temperature difference what so ever. Since cables are inexpensive containers should be able to travel 5-10 kilometers through the mid water or at the surface to the shore so that the cable system can deliver cold water to a shelf mounted or shore based OTEC system.

The container can be fitted with a vacuum pump to so that the contents are vacuum sealed or fitted with a refrigeration system ensure the water remains cold.

Grippers

Grippers hold the container to the cable, the grippers can open and close, once a container is held by the wings and wheels the grippers detach from the container allowing it to load or unload or both whilst the cables remain in motion, this is important to the brine system so that the cables continue to generate electricity and important to the OTEC system because the OTEC system requires a very large amount of water consistently.

Contracting Socket to Hold Container During Extraction.

As the container reaches the surface it is gripped by the wheel system and at the same time the walls or the socket close to thoroughly hold the container in place.

Container Membrane

So that the container does not create a vacuum when emptying the container may have a vacuum-prevention device, such as a membrane like a syringe which will change shape to compensate for the extraction of the cold water. Either the membrane lies inside the container so that brine or waste cold water can be placed inside or the '6$^h$' side of the container moves down so that sea water fills the potential void. This membrane can be motorized and insulated or driven by the suction of the pump.

Spring Mounted Membrane and Spring Mounted Doors

The container mounted with a spring on a piston (like a syringe) so that no pumps need to be located at the sea bottom, an electromagnet releases the spring so that the fluid can be pushed out. When fluid is drawn the spring is stretched and when the spring is released the spring pulls the piston down force the fluid out, (the liquid will be negatively buoyancy but the membrane may have a large friction and so extra force is required. The spring also allows for the spring to be loaded slowly and close rapidly.

Motorized Piston

A motorized piston can be to force out the liquid rapidly, small turbine can be attached to the container to charge a battery which provides energy for the motor, and alternatively the motor can be driven by a battery which can charge every time the container is at the surface. The same principle can be sued to drive doors and membranes.

Compressed Air/Gas

In order to open the door of the container and drive the membrane, tanks of compressed gas are used to drive the piston and open the doors, air is forced into a chamber which increases in pressure as air is force into it which forces open the doors and the membranes.

Alternatively air is forced out of the tank which is connected which is connected to the doors and membranes the air is either fired out into the sea or sprayed at a late or into a series of grooves.

The tanks in question can be attached and detached from the container easily, and can be filled with a less compressible gas, if it is convenient, the membrane and doors can be buoyant or neutral so lessen the amount of air required. Electro magnets which can be triggered by radio signal infra-red or remote control or pressure can assist in closing the doors.

'3'rd Cable' to Drive Cable

If the piston is lower and the cables are holding the container in place at the sea bottom the piston can be pulled up using a third cable which is wound up around a drum at the surface and extends as the container is lowered. The membrane can be buoyant so that it is only forced down by the pressure of the pumps. In fact the container can be driven like a puppet from the surface including the opening and closing of the doors.

Loaded Spring to Push Containers

A loaded spring can be used to push the containers up to speed as the spring is loaded behind the container when the spring is released it pushes the container and is then loaded for the next container.

Pipes and Bearings Rather than Wheels

The cable passes through a tube with bearing inside rather than around a wheel, this type of system can be used in a one or two way system if the tube has a slot on one side which allows the containers grippers to pass through.

Hydrodynamic Wheel Casings

Rather like an Olympic bicycle there will be no spokes and streamlined plates will cover the wheels so that there are no spokes to cause unwanted drag.

Angled so not to Steep

The use of buoyancy towers so that the cable angles can be made to be gentle i.e. rather than passing straight up and down the cables are made into an egg shape.

Surface Long Distance Water Delivery

Potable water is buoyant so if it is placed in a container under the water it will rise to the surface diagonally, alternatively hydrogen or water can be placed into containers and taken to shore along cables, an electricity transmission line can be placed alongside the cable system and supported by it.

Mid-Water Long Distance Delivery Construction and Extraction Point

Same design only mounted in shallow water and supported by legs

Air Conditioning/on Shore OTEC Desalination Delivery System.

The cold water is brought to the surface and is pumped to a point just above sea level, the water then travels through an insulated hose to the shore, only in order to prevent the water from warming the hoses descends back into the deeper water and up along or close to the sea bed. Due to the direct/on of the flow and the mass of the cold water the water will flow all of the way to shore, and being pumped from the offshore end the hoses will remain open. Sufficient head must be created and in order to achieve this some pumping may be required. In order to insulate the pipe efficiently the new cold water can be surrounded in a second hose by the waste cold water.

Alternatively the hoses can join a pipe close to shore with the pipe mounted on the sea bed and the hose suspended mid water until it joins the pipe.

In order to guarantee cold water, the offshore hose will waste some of the new cold water using a double hose some new waste cold water will surround the inner insulated hose in order to ensure that the inner cold water does not warm to the extent that it is useless, the outer cold water will also flow to shore and it is still nutrient rich and potentially quite cold, thus it could be used in Mariculture or low-temperature thermal desalination (LTTD).

A Fluid Dynamic Current Shield

A fluid dynamic current shield is basically a series of sails held on a cable or rails around the platform, the shield can be used as a pump or to generate electricity when there is a current but its main purpose is to take the power out of the current rather like a wind break.

A Current Break

The same purpose as the current shield only that the shield is static and simply deflects the current energy away from the platform, the current break can be pointed and held by a different set of cables and buoyant supports.

A Roof

A roof like a house can be place over the platform to protect it from waves.

Submarine Systems

The OTEC and desalination systems can be placed inside or joined to, a 'submarine habitat container' (A container which can support human life under the water so that humans can live and operate the system from under the water) this way the OTEC system can operate on a platform under the water and can operate through storms and the humans will be safe, the OTEC system can at least partially contribute to the life support systems. The containers can be fitted with a snorkel fitted with an air pump so that it does not depend on life sport systems during fair conditions. Some of the containers can contain life support systems and living space whilst other will be like an engine room, there may be several engine rooms to each container built for living and managing the OTEC systems. The engine room container can either be fitted with snorkels, life support or the engineers must either use scuba or carry an air supply to lower the extent of the life support systems.

The engine rooms can be flooded during normal conditions and emptied and filled with air or brought to the surface for maintenance the container can be detached from the platform for a complete overhaul and another serviced container can replace it so that the system can continue operating. These containers can partially or completely contribute to the buoyancy of the system.

Multiple cable systems can be joined together and an access tunnel can join the systems together, each container can be permanently or semi permanently filled with air. If the system is OTEC or desalination the condenser section can be fitted with radiator pipes filled with waste co)d water to maintain a lower temperature or the condenser side can be fitted with a cold water powered air conditioning unit, alternatively the entire OTEC condenser chamber can be filled with waste cold water if the system is not operating within an air space.

These submersible systems would be placed on the tension leg subsurface platform.

A Separate Cable and Container System for Waste Warm and Cold Water.

Placing all of the waste water into the container using a membrane will leave an excess of water which will not fit in with the delivery speed of the system, a separate cable and container system will be filled with any waste water, the waste water will be colder than the surface water and so it must not be deposited at the surface, this water is colder than the surface water and may just sink placed into a container it will fall down, this system can either fall on its own accord or be driven by a motor.

Materials

Possible materials for the containers and hoses include carbon fiber, fiber glass aerogel, poly styrene, metals including aluminum or steel, denier nylon, water resistant plastic.

Silver foil, neoprene, animal fat, blubber, petroleum jelly for lining the hoses and containers, and in large quantities.

Horizontal Cable Concepts

The use of at least two sets of buoyant structure which will create a length of the cable which is held out horizontally rather than vertically this will provide a platform for the diving container to rest at the surface so that it can empty, not only this but holding it horizontally will mean that, for example a 2 m×18 m×20 m container will not have its bottom 18 meters beneath the surface but 2 this will mean that in a relatively large boat the cold water can flow out of the diving container with the use of gravity. The horizontal definition includes holding the container at a downwards angle towards the surface container so that the container can empty with the use or aid of gravity.

The diving container can be held at an angle by having a different height from the surface at each end, the wheels held on one pair of buoyant supports being lower than the second pair of wheels.

Gravity Feed

Gravity feed means that the diving container is held above or at a slanting angle to the surface container so that the water can move from the diving container at a good speed and in large volumes and without pumping. This will enable the diving container to empty rapidly so that the diving container can return to the bottom whilst the water brought up is still being used Surface Container Detachment Functions The Surface Container Hoses can Attach to the Hull of the Boat Under the Water, and Doors on the boat can open when the hoses are attached and close when the hoses are detached the boat will not sink. The rest of the OTEC system condenser evaporator etc. can be held in a boat which can return to port the case of a storm because it can simply detach from the surface container. With the whole delivery system underwater the water will remain a low weight reducing the energy consumption of the system. The condenser within the boat with the use of the horizontal cable concept will be at a similar height or even lower than the bottom of the diving container making it easy to transfer the Coldwater.

Top Structure with Geo Synchronous Navigation

A system for use in a mid-water environment without bottom mooring would be advantageous to companies wishing to use OTEC to produce hydrogen and use the thermal energy from places where The water is deeper than 1000 m. The platform has the ability to remain to remain in the same position without mooring and so it would not need a mooring.

Onshore OTEC/Air Conditioning/Desalination/Mari Culture/Hydrogen Production

The design is the same except that rather than empty the water into a ship the water is transferred along a surface pipe via the surface container along a second cable system wherein containers travel all of the way back to shore before being emptied. The surface cable system will allow for containers of brine to be neutralized the cable system will be able to hold many containers and will be able to detach close to shore and empty their contents into a large pipe close to shore.

Bottom Wheel Mooring

The Bottom structure on the ground can be held by its mass at the bottom, but with stored buoyancy hooks for a crane to lift it, are fitted on the bottom structure for maintenance, or a dead weight with a quick release mechanism is fitted so that when repairs are required the dead weight is dropped and the structure rises. Using large potable water bags filled with brine as a dead weight to hold the bottom wheel, the brine can simply be removed via a quick release and the whole bottom system would return to the surface either because without the brine it is buoyant or the cable system can pulled up from the surface.

Alternatively a small hose leads to the surface so that gasoline or similar fluid can be pumped into generally redundant sealed lift bags so that they will lift when filled with an uncompressible liquid like gasoline. The structure would then lift to the surface from maintenance.

Mid-Water System

A bottom structure for use mid water in which a cable weighted down will hold a bottom wheel for either a one way or two way cable systems the surface platform will be equipped with geostationary sensors and a means on the surface to move the entire system will allow for a system to work mid water. The bottom section will be weighted so that it exerts a down ward force keeping it at the bottom of the cables.

Propeller Rather than Transmission Cable

One (1) or more propellers connected to an alternator and power the opening of the diving container doors or the driving of the membrane since it might be cheaper than a cable, commands can be triggered sensed and sent to open the doors the right time without a command wire with the use of trip switches or radio signals.

Bio Fouling Filter

At any location of the diving container doors or the surface container and prior to reaching the condensers the system can be fitted with filters so that the condensers are not contaminated.

Air Conditioning and on Shore OTEC Desalination Delivery System.

The cold water is brought to the surface and is pumped to a point just above sea level, the water then travels through an insulated hose to the shore, only in order to prevent the water from warming the hose descends back into the deep and up along the sea bed. Due to the direction of the flow and the mass of the cold water the water will flow all of the way to shore (shore point being slightly lower than the offshore point, being pumped from the offshore end the hoses will remain open. Sufficient head must be created in order to achieve this some by raising the point of the offshore hose above sea level, or some pumping may be required. In order to insulate the pipe efficiently the new cold water can be surrounded in a second hose by the waste cold water.

Alternatively the hoses can join a pipe closer to shore. In order to guarantee cold water the offshore hose will waste some of the new cold water by using a double hose (hoses within a hose) some new waste cold water will surround the first hose, in at least one more hose (preferably insulated), in order to ensure that the inner cold water does not warm to the extent that it is useless, the outer cold water is still nutrient rich and potentially quite cold, thus it could be used in Mariculture or LTTD.

FIG. 1 is an exploded view of a system for raising water 10 for use with an ocean thermal energy conversion system, in accordance with a first exemplary embodiment of the present disclosure. The system for raising water 10, which may be referred to herein as 'system 10', may create buoyancy with fully sealed air lift bags 20 or hollow containers, such as made from carbon fiber, fiber glass, plastic, metal, or another material, that is filled with air, a buoyant liquid, or foam. The buoyancy can be streamlined and design so that their shape gives them lift in a water current. The system 10 also may include extractors cases 30 containers, 40 arms, and cables 50, which may be drawn into the extractor cases 30. Prefabricated OTEC systems may be placed in the middle of a frame of the system 10 or above it.

Figure 2A:
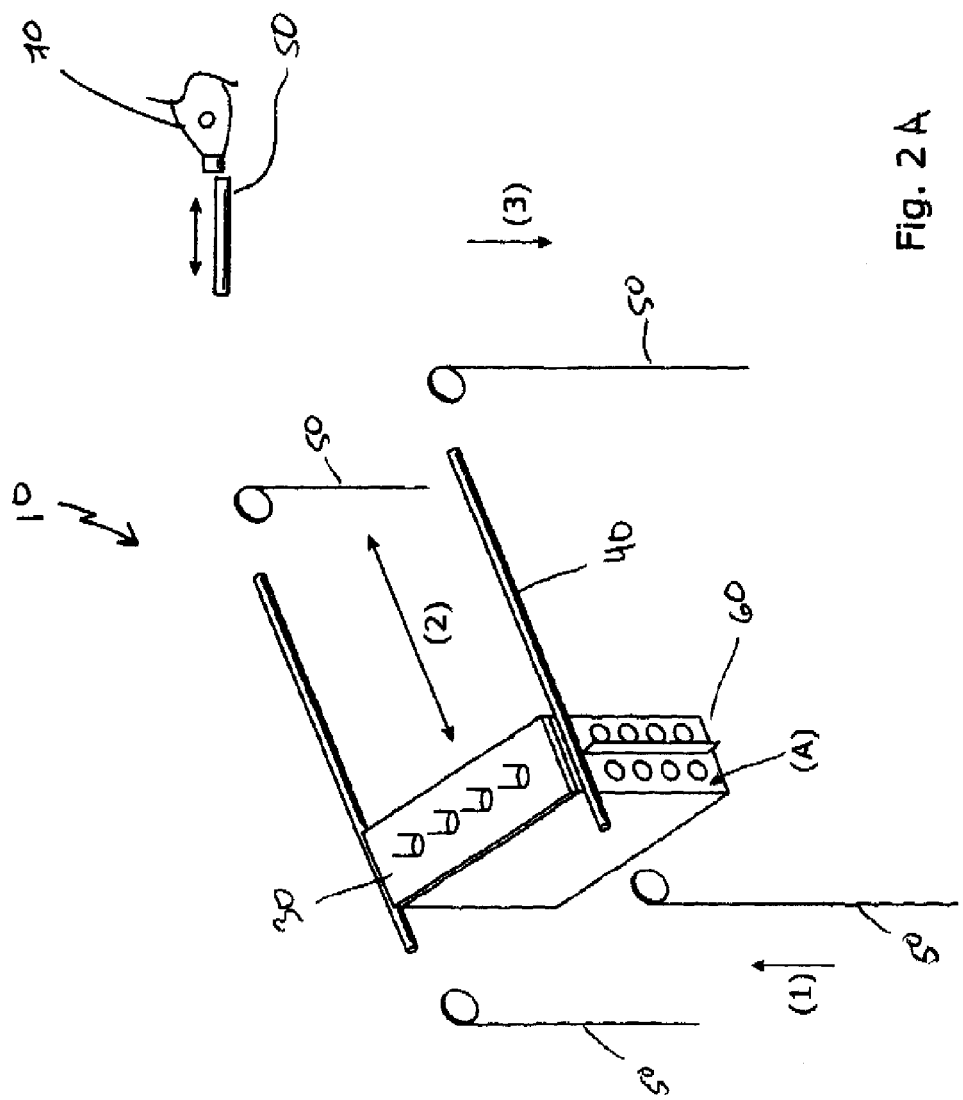
FIG. 2A is an exploded view of a system for raising water for use with an ocean thermal energy conversion system, in accordance with the first exemplary embodiment of the present disclosure.
Figure 2B:
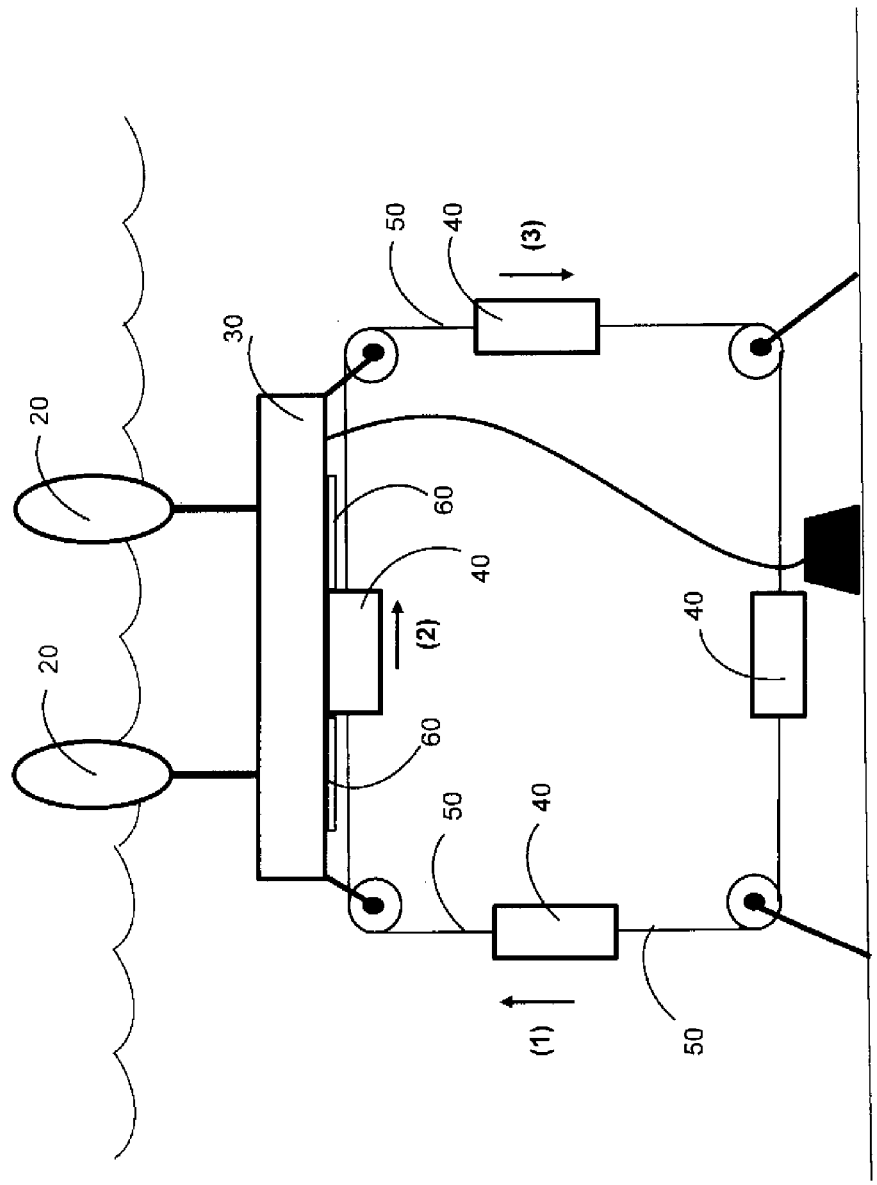
FIG. 2B is a schematic view of a system for raising water for use with an ocean thermal energy conversion system, in accordance with the first exemplary embodiment of the present disclosure.

FIG. 2A is an exploded view of a system for raising water 10 for use with an ocean thermal energy conversion system, in accordance with the first exemplary embodiment of the present disclosure. FIG. 2B is a schematic view of a system for raising water 10 for use with an ocean thermal energy conversion system, in accordance with the first exemplary embodiment of the present disclosure. While FIG. 1 illustrates extraction one way, FIG. 2A and FIG. 2B illustrates another extraction option, namely for any system 10 which uses more than two containers 40 per set of cables 50 and one which must keep the cables 50 moving in the same direction. This system 10 may be known as the dense liquid gravity system. The system 10 includes at least one fully sealed air lift bag 20, one or more containers 40, an extractor case 30 having at least one rail 60 on which the extractor case 30 moves the container 40. The motion of the container 40 may include rising up and connecting with the extractor case 30, as is indicated by arrow (1), and is then moved across the extractor case 30, as is indicated by arrow (2). The container 40 may connect to the extractor case 30 and then be placed back on the descending cables 50 to descend, as is indicated by arrow (3). The extractor case 30 can have a bowler fitted to it so that it does not run out of liquid to pump as it travels back to connect with a new container 40. Grippers 70 may tighten around the cables 50, wherein wings gripped by wheels which can accelerate the container 40 to the speed of the cables 50.

Figure 3A:
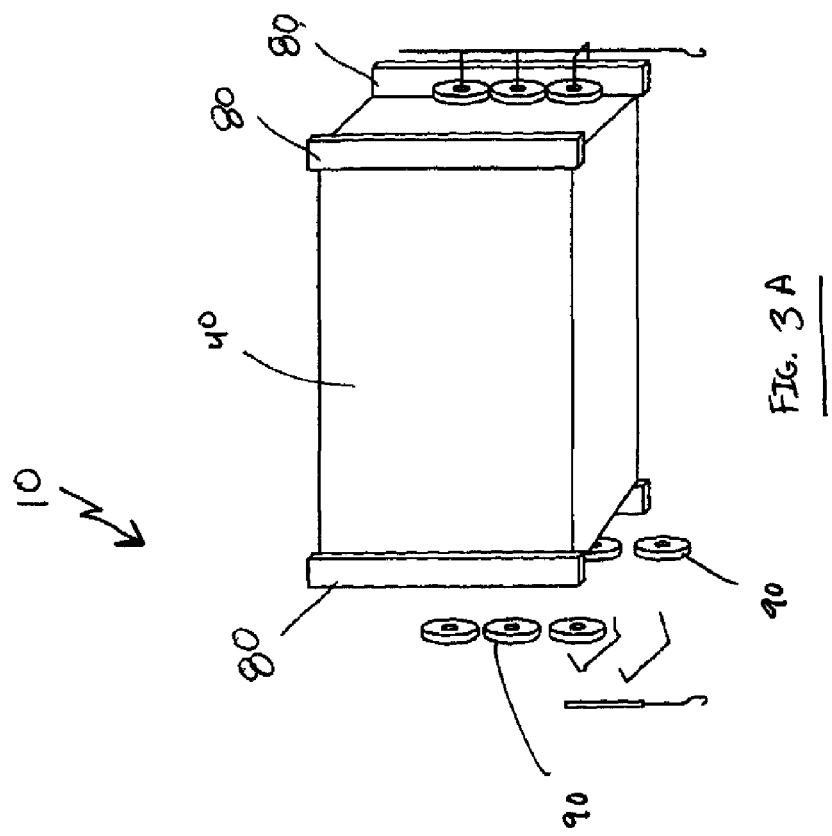
FIG. 3A is an exploded view of a system for raising water for use with an ocean thermal energy conversion system, in accordance with the first exemplary embodiment of the present disclosure.
Figure 3B:
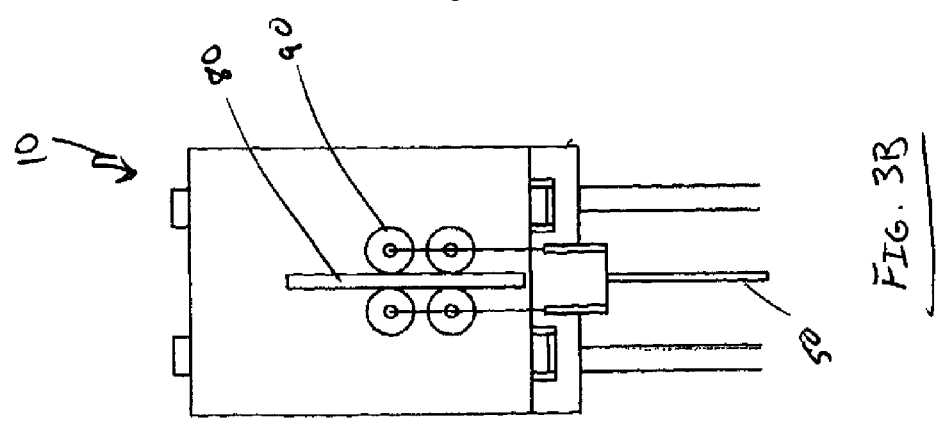
FIG. 3B is a side view of a system for raising water for use with an ocean thermal energy conversion system, in accordance with the first exemplary embodiment of the present disclosure.

FIG. 3A is an exploded view of a system for raising water 10 for use with an ocean thermal energy conversion system, in accordance with the first exemplary embodiment of the present disclosure. FIG. 3B is a side view of a system for raising water 10 for use with an ocean thermal energy conversion system, in accordance with the first exemplary embodiment of the present disclosure. As is shown in FIGS. 3A-B, the system 10 may include a plurality of wings 80 and wheels 90. The wings 80 may be connected to the container 40 such that the wheels 90 can tighten around the wings 80 to fully grip the wings 80. The extractor case may gains a better seal with the container 40 due to the force of the wheels 80 on the container and into the extractor case without using the cables 50.

Figure 4A:
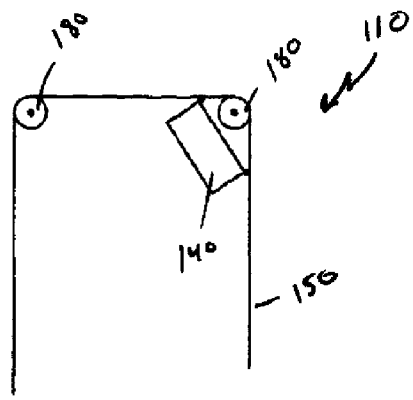
FIGS. 4A-C are views of cable concepts for a system for raising water for use with an ocean thermal energy conversion system, in accordance with a second exemplary embodiment of the present disclosure.
Figure 4B:
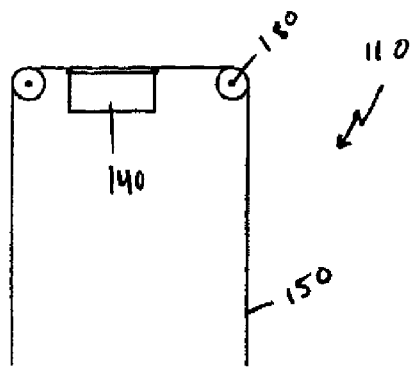
Figure 4C:
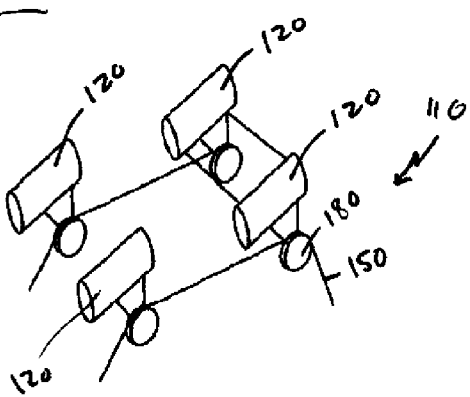

FIGS. 4A-C are views of cable concepts for a system for raising water 110 for use with an ocean thermal energy conversion system, in accordance with a second exemplary embodiment of the present disclosure. The containers 140 are held on cables 150 that run over wheels 180 connected between the lift bags 120 and may have plenty of room to operate without the use of an expensive boat. Since this invention uses rectangular cuboid structure and the use of gravity to release the cold water the diving container 140 must be held higher than the surface container 140, the use of gravity to empty the diving container 140 will allow for a rapid release of cold water without the use of powerful pumps. If the containers 140 were simply held up right and attached to a boat not only would have to pump the cold water upwards wasting electricity but they would require a large boat due to the size of the containers 140. In order to make the angles gradual there can be towers supported by buoyancy rather like the tower on a ski lift; these towers are anchored to the sea bottom and gradually change the angle of the container so that it is horizontal.

Figure 5:
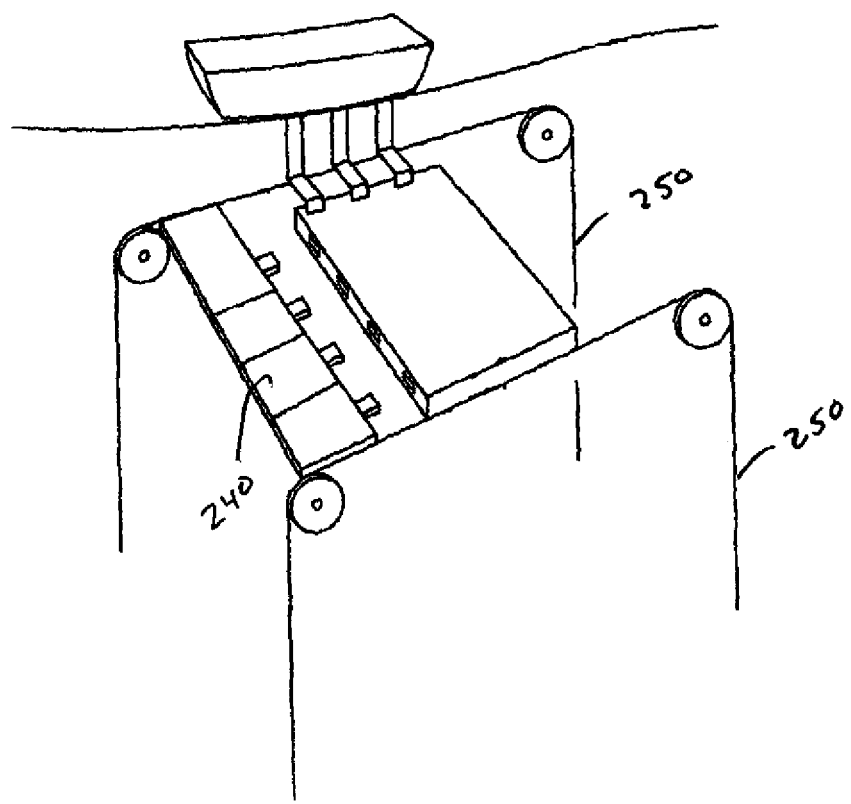
FIG. 5 is a plan view of a large scale wing system for raising water for use with an ocean thermal energy conversion system, in accordance with a third exemplary embodiment of the present disclosure.

FIG. 5 is a plan view of a large scale wing system for raising water 210 for use with an ocean thermal energy conversion system, in accordance with a third exemplary embodiment of the present disclosure. The weight of the cold sea water is only slightly denser than the warm surface water by approximately 4 kg per cubic meter and so very large containers 240, for example, a 500 cubic meter container 240 would only be holding 2 tons of water. Cables 250 made for the oil industry are known to be able to hold well over 100 tons and cost approximately £100000 ($155,000 USD) for a 2 kms length of cable with a safe working load of 100 tons. There is economy of scale in the use of such cables 250, the use of multiple containers 240 held together to form a wing will create a heavy yet hydro dynamic mass so that it is worthwhile using large cables 250 in order to achieve maximum value for money.

Figure 6A:
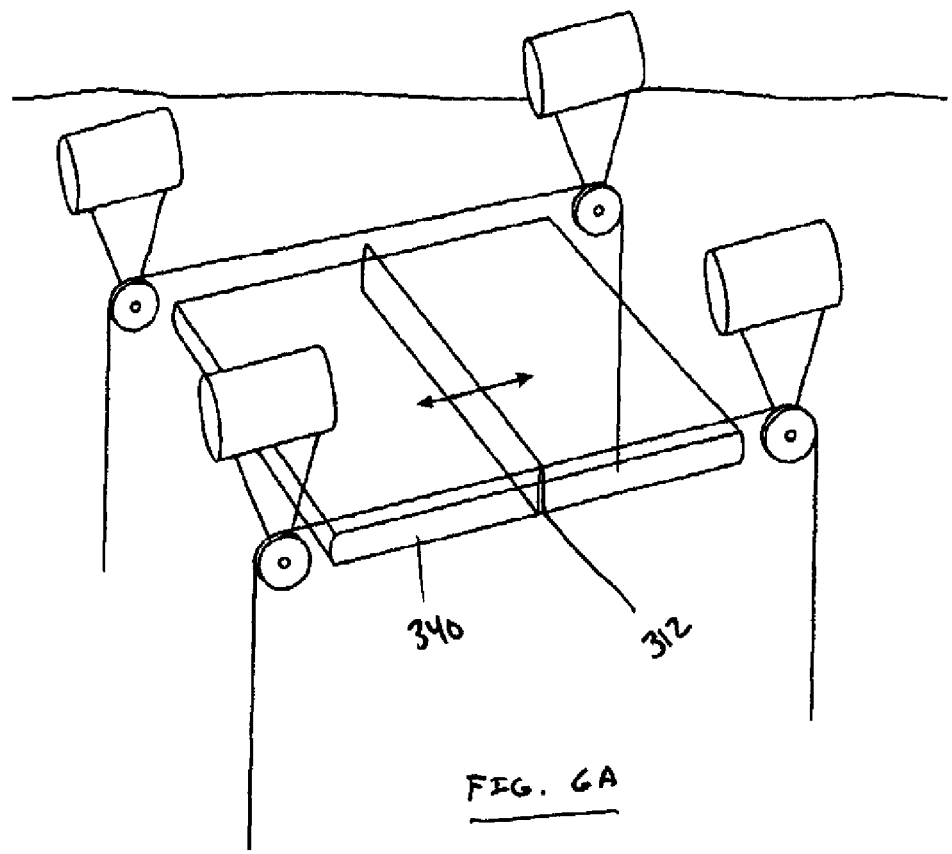
FIGS. 6A-B are a plan views of a system for raising water for use with an ocean thermal energy conversion system having male-female docking with middle membrane for rapid brine waste input, in accordance with a fourth exemplary embodiment of the present disclosure.
Figure 6B:
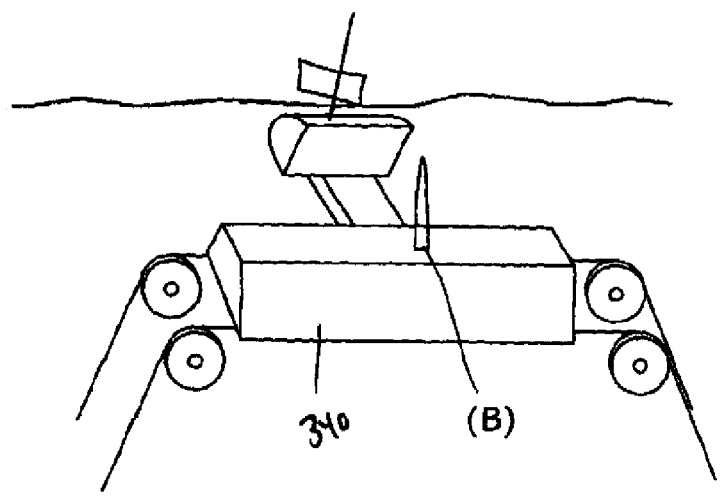

FIGS. 6A-B are a plan views of a system for raising water 310 for use with an ocean thermal energy conversion system having male-female docking with middle membrane for rapid brine waste input, in accordance with a fourth exemplary embodiment of the present disclosure. The diving container 340 is fitted with a movable membrane like a syringe but with both ends designed so that they can make a seal 312 so that when held at an angle at the surface it can empty whilst being submerged due to gravity and fill at the same time with at least one of waste cold water and brine, if none of these are available then simply sea water, the new cold water remaining separate from the waste water due to the membrane. Due to the angle of the container the new cold water will empty from gravity and will not need to a snorkel because it is filling with waste cold water and brine, so that the container 340 does not form a vacuum under water and the weight of the brine and waste cold water will create additional force on the opposing side of the membrane driving the membrane and forcing the new cold water out of the container 340. When brine and waste cold water and brine is being used the waste water will be marginally denser than the new cold water acting as negative ballast the membrane is driven by at least one of gravity, a motor and rack and pinion gear so that if it has neither brine or waste cold water available the system can still function without generating a vacuum as the container 340 is underwater.

The bag and cage or rigid container 340 are rectangular cuboid and travel from top to bottom with the front or back being the smaller surface area the length of the rectangular cuboid is greater than the depth of the surface container 340 and so gravity feed is not possible unless the cuboid can rotate so that the larger length is no longer facing up but horizontal to the water the water will then empty form the bottom into the surface container via gravity and pumping, the top of the container 340 is fitted with a snorkel 314 so that it can draw in air as it empties so that a vacuum does not interfere with the emptying of the vessel this container will not fill with brine or waste cold water and once emptied will fill with sea water or once the diving container is empty it either fills with waste cold water or brine or simply fills with ordinary sea water.

The male side can be the hydrodynamic nose of the diving container 340 the female side can be designed to from a perfect seal around the hydrodynamic nose of the diving container 340. In the case of the membrane container 340, the motion of the container 340 with it front doors open will force the membrane back in the case of a one way system. In the case of a two way system, the container 340 will briefly open the membrane to replace the cold water or the motion of the open container will naturally vent the waste water.

Figure 7:
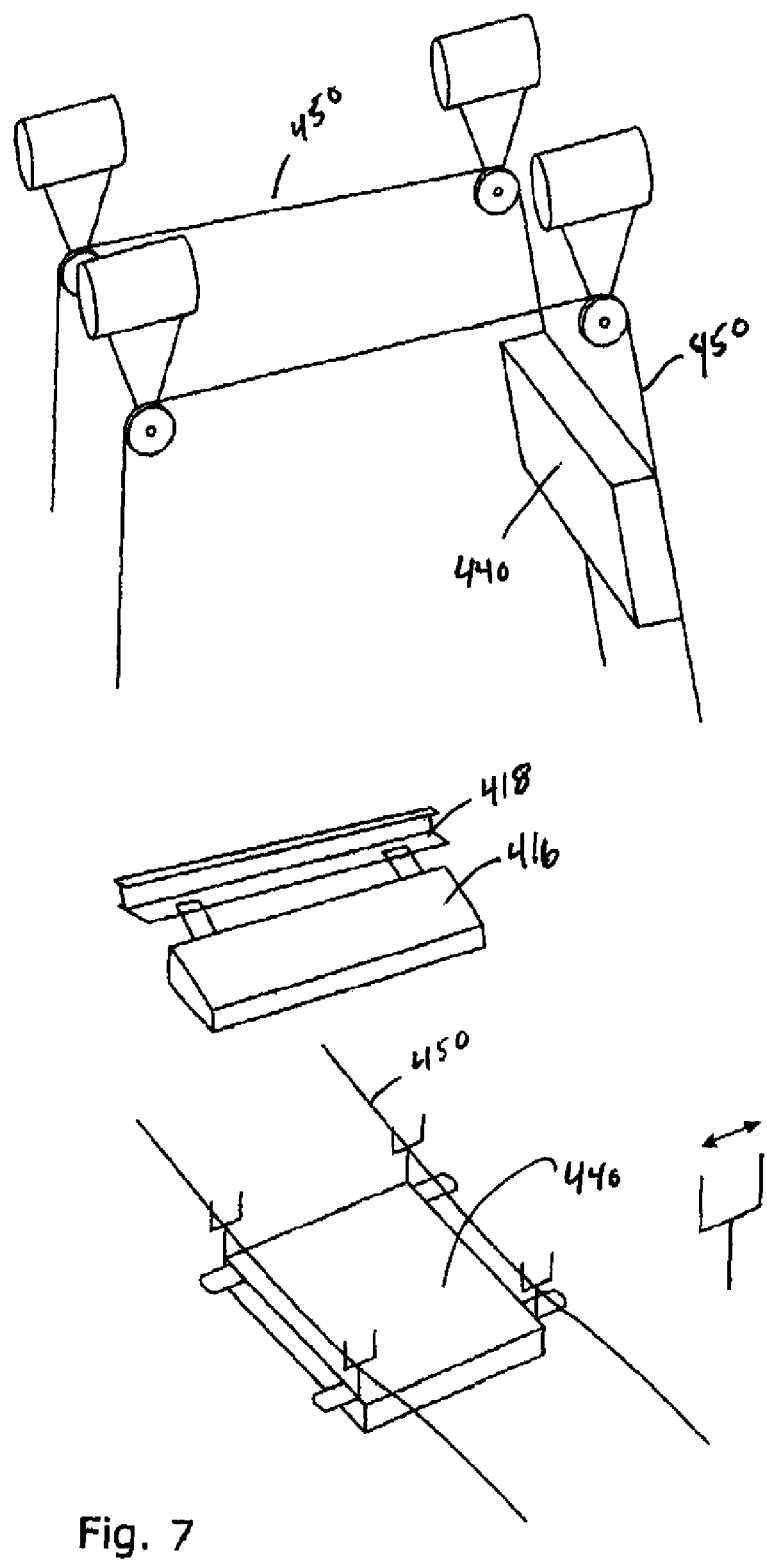
FIG. 7 is a plan view of a one-way continuous system for raising water for use with an ocean thermal energy conversion system, in accordance with a third exemplary embodiment of the present disclosure.

FIG. 7 is a plan view of a one-way continuous system for raising water 410 for use with an ocean thermal energy conversion system, in accordance with a third exemplary embodiment of the present disclosure. Containers 440 can be removed from the cables 450 and the cable 450 will continue to operate, to allow a more continuous movement. At present, the demand rate of a 1 mw closed cycle OTEC plant is approximately 2 cubic meters per second, rather than pumping at a rate of 2 cubic meters per second the containers 440 will have a capacity of around 500 to 700 cubic meters or enough water to supply the condenser for about 5 minutes. During this time another container 440 will be brought to the surface and so before any one container 440 has been fully used another will be at the surface ready to supply the condenser with water. The surface structure 416 is fitted with a rail 418 so that the containers 440 can detach from the cables 450 and empty while they are held to the rails 418 as the cable 450 continues to move.

Figure 8:
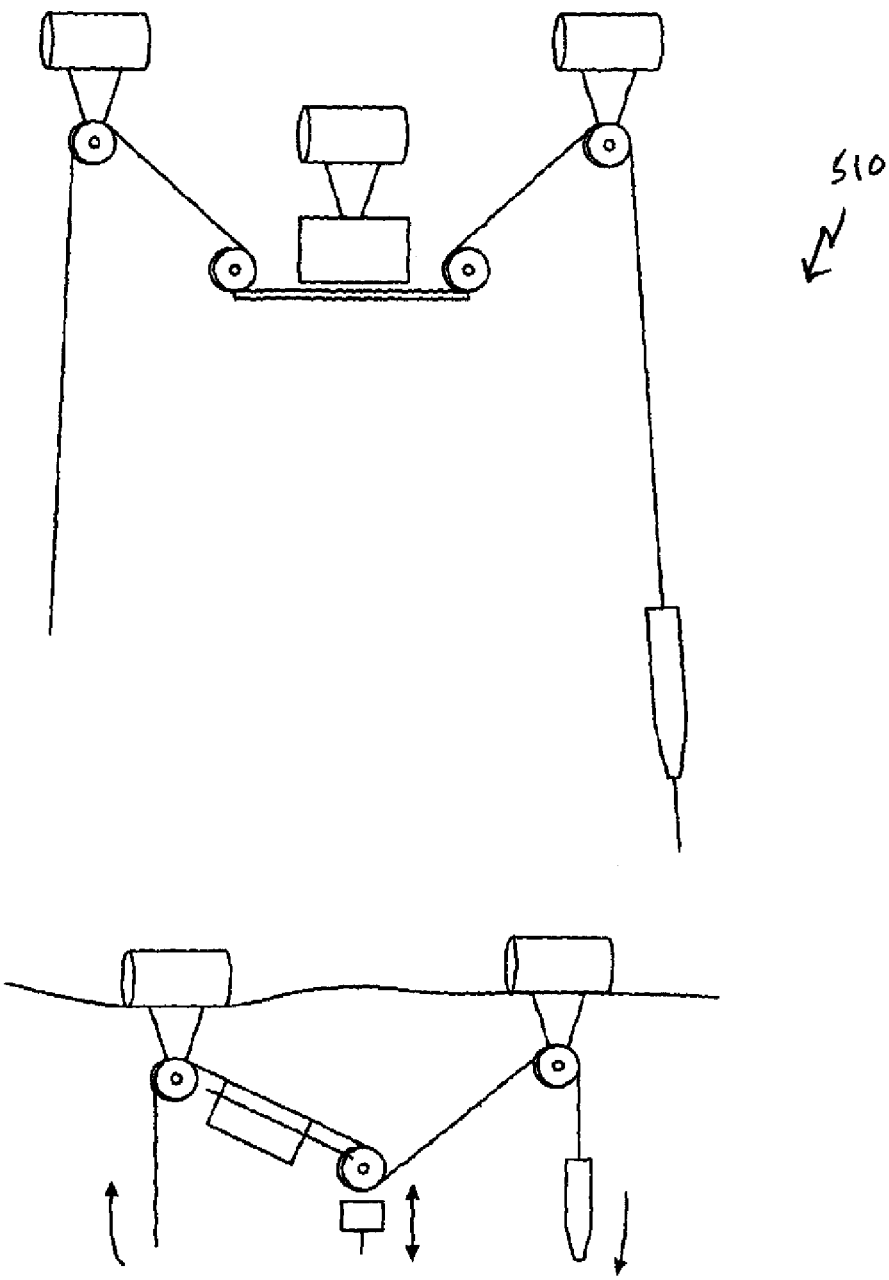
FIG. 8 is a side view of a one-way and two-way system for raising water for use with an ocean thermal energy conversion system, in accordance with a fourth exemplary embodiment of the present disclosure.

FIG. 8 is a side view of a one-way and two-way system for raising water 510 for use with an ocean thermal energy conversion system, in accordance with a fourth exemplary embodiment of the present disclosure. In particular, FIG. 8 shows how one-way and two-way cable systems both feed by gravity into the surface container. The containers detach from the cables so that the cable continues to move whilst the diving container is emptying. The surface container can be controlled to move up and down to allow the diving container to pass alternatively the rail can be mechanically tilted and mechanically taken back and forth.

Figure 9:
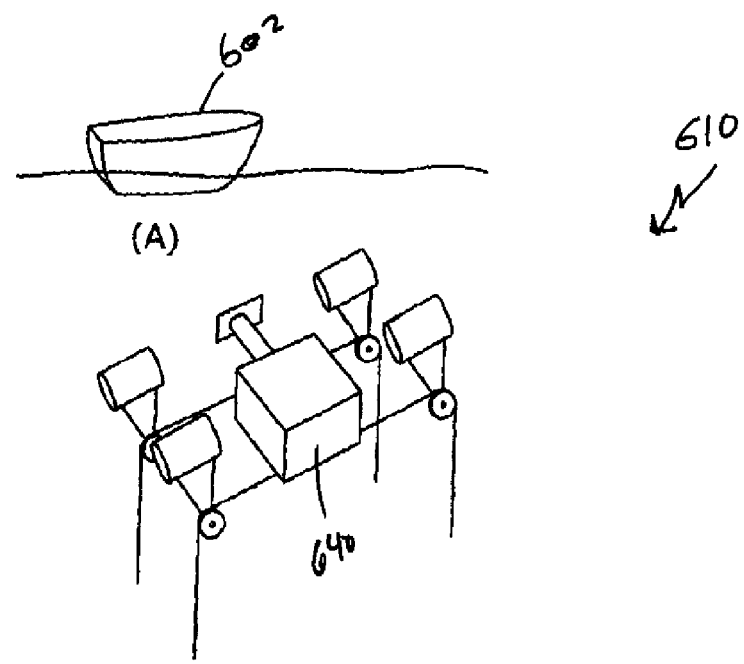
FIG. 9 is a plan view of a surface container detachment system for use with a system for raising water for use with an ocean thermal energy conversion system, in accordance with a fifth exemplary embodiment of the present disclosure.
Figure 9:
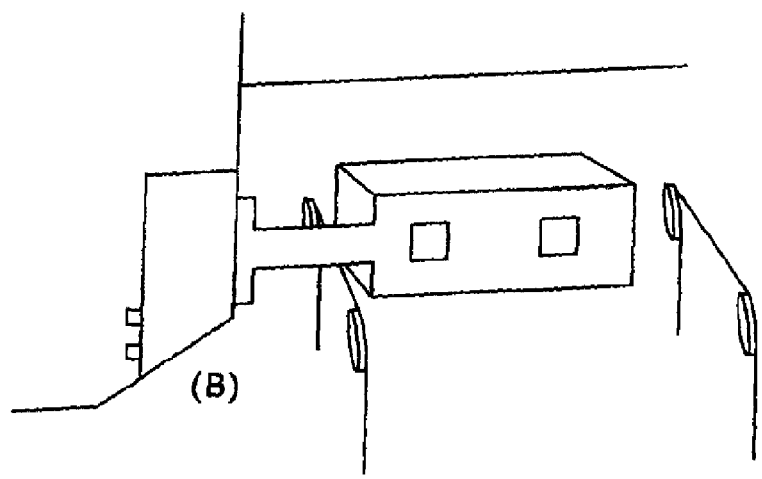

FIG. 9 is a plan view of a surface container detachment system for use with a system for raising water 610 for use with an ocean thermal energy conversion system, in accordance with a fifth exemplary embodiment of the present disclosure. Keeping the cold water below the surface during extraction at the surface will keep the weight of the water low (A). The boat 602 used to hold the main components of the system 610 can join to the surface container 640 under the water so that the cold water does not have to be lifted onto the boat 602, a much smaller reservoir can be held in the boat 602.

The surface container hoses can attach to the hull of the boat 602 under the water, and doors on the boat 602 can open when the hoses are attached and close when the hoses are detached the boat will not sink (FIG. 9 depicts the hoses detached from the boat 602). The rest of the system 610, including the condenser, the evaporator, etc. can be held in a boat 602 which can return to port the case of a storm because it can simply detach from the surface container 640. This would result in a minimal surface system that would be storm resistant and its low cost design would be easy to replace in the event it was lost in a storm.

Figure 10:
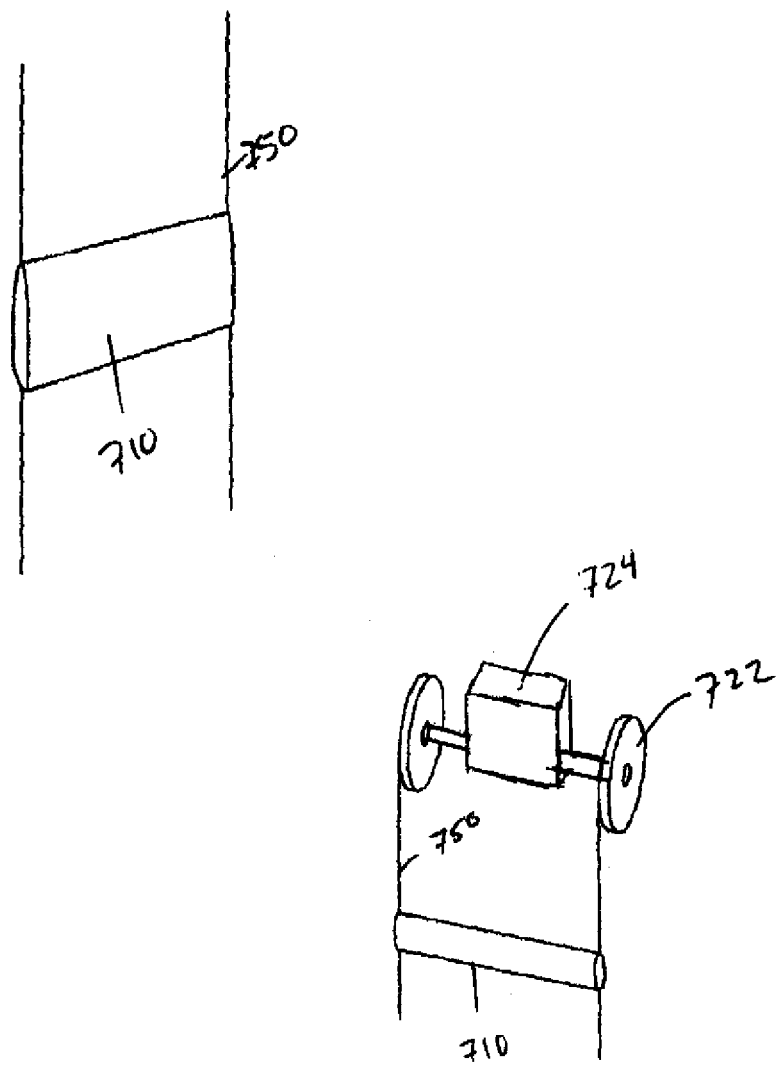
FIG. 10 is a plan view of a buoyant section for use with a system for raising water for use with an ocean thermal energy conversion system, in accordance with a sixth exemplary embodiment of the present disclosure.

FIG. 10 is a plan view of a buoyant section 710 for use with a system for raising water for use with an ocean thermal energy conversion system, in accordance with a sixth exemplary embodiment of the present disclosure. In order to lower the weight of the cable 750 itself, buoyant sections 710, such as neutralized buoyant strips of foam or modules containing a buoyant liquid and held to the cables may be used. These buoyant sections 710 will neutralize the weight of the cable 750 so that there is no need for the cables 750 to support their own weight. The buoyant strip 710 can pass over the moving wheels at the surface this will allow the maximum amount of weight to be held by the cable 750. The buoyant strips 710 will be streamlined.

The cable 750 can be driven by a winch 24, where the cable 750 is wound around a drum 722. 1 cable and one container may be wound around at least one wheel (drum) 722 preferably at least three drums 722 for extra traction. Around at least one drum 722, the drum 722 drives the cable 750 and the cable 750 is wrapped right around the drum 722 so that the cable 750 connects with approximately 360 degrees of the drums 722 surface, preferably the drum 722 is covered in rubber for extra grip. Driven by at least one pair of wheels with rubber wheels which are compressed into the cable so that they grip it very tightly, the wheels can be held within pipes or on their own. All of these drive methods can use additional wheels to keep the cables in line they are all driven by a motor.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A system for raising water comprising:
   at least one submerged platform positioned within a body of water, wherein the at least one submerged platform is buoyantly held up from a bottom surface of the body of water, and wherein the at least one submerged platform is held below a top surface of the body of water by at least one mooring attached to the bottom surface of the body of water;
   at least one cable movably connected to the at least one submerged platform; and
   at least one container held by the at least one cable, wherein a quantity of water is emptied from the at least one container.

2. The system of claim 1, further comprising at least one vacuum-prevention system formed on the container, wherein the at least one vacuum-prevention system prevents a vacuum from forming in the at least one container when it is being emptied of the quantity of water, wherein the at least one vacuum-prevention system further comprises at least one of: a snorkel; and a contractible section formed within the at least one container.

3. The system of claim 1, wherein the quantity of water further comprises a quantity of cold water for use in an ocean thermal energy conversion (OTEC) system.

4. The system of claim 1, wherein the at least one container is movable between a first location proximate to the at least one submerged platform and a second location positioned below the first location and remote from the first location.

5. The system of claim 1, further comprising an extractor case positioned on the at least one submerged platform, wherein the quantity of water is emptied from the at least one container to the extractor case.

6. The system of claim 5, wherein the quantity of water is emptied from the at least one container to the extractor case using at least one of at least one pump positioned on the at least one submerged platform; at least one container membrane driven by a motor; at least one pump positioned on the at least one container; and at least one pump positioned on a watercraft.

7. The system of claim 5, wherein the at least one container is attachable to the extractor case, wherein once attached to the extractor case the at least one container and the extractor case move across the at least one submerged platform while the quantity of water is emptied, wherein the extractor case moves into alignment with a downward traveling cable portion of the at least one cable, and wherein a plurality of wheels drive the at least one container onto the downward traveling cable portion.

8. The system of claim 7, further comprising at least two extractor cases, and wherein the at least one cable is movable in at least two directions.

9. The system of claim 1, wherein the at least one cable is movable on at least one of:
   at least one wheel connected to the at least one submerged platform and at least one wheel positioned proximate to the bottom surface of the body of water; and
   at least one pipe fitted with at least one bearing, wherein the at least one cable is not disconnectable from the at least one bearing.

10. The system of claim 1, wherein the at least one submerged platform further comprises at least one buoyant support joined to at least one elongate member, wherein the at least one submerged platform holds at least one of:
    a submerged surface container, which is connectable to at least one of a watercraft and a fluid hose;
    at least one extractor which joins to at least one of a watercraft or a fluid hose;
    at least one wheel;
    at least one cable to drive the at least one container;
    at least one motor to drive the at least one cable;
    an electricity supply;
    at least one cable driving system; and
    at least one pump.

11. The system of claim 1, wherein the at least one container is disconnectable from the at least one cable, wherein the quantity of water is emptied from the at least one container when it is disconnected from the at least one cable.

12. The system of claim 1, wherein the quantity of water is emptied from the at least one container through at least one pipe, wherein a second quantity of water is added to the at least one container, wherein the first and second quantities of water are separated by at least one membrane.

13. The system of claim 1, where the at least one submerged platform is joined by a rigid joint to at least one buoyancy container positioned beneath the at least one submerged platform, wherein the at least one buoyancy container is held beneath the top surface of the body of water, wherein the at least one submerged platform is moved during large wave conditions to prevent the at least one submerged platform from moving up and down relative to the top surface of the body of water.

14. The system of claim 1, wherein the at least one cable is driven by at least one of:

a winch, wherein the at least one cable is wound around at least one drum, wherein the at least one drum drives the at least one cable which is wrapped around the at least one drum so that the at least cable connects with approximately 360 degrees of a surface of the at least one drum; and at least one pair of wheels with rubber surfaces which are compressed into the at least one cable to allow the at least one cable to grip the rubber surfaces tightly.

15. An ocean thermal energy conversion (OTEC) system comprising:
   at least one OTEC apparatus; and
   at least one container supplying a quantity of cold water to the OTEC apparatus, wherein the at least one container is attached to at least one loop of a cable, wherein the cable is driven in a single direction.

16. The OTEC system of claim 15, wherein the at least one OTEC apparatus further comprises at least one submerged platform positioned within a body of water, wherein the at least one submerged platform is buoyantly held up from a bottom surface of the body of water, and wherein the at least one submerged platform is held below a top surface of the body of water by at least one mooring attached to the bottom surface of the body of water.

17. The OTEC system of claim 16, further comprising at least one wheel positioned proximate to a bottom surface of the body of water, wherein the at least one loop of a cable is movably connected to the at least one wheel.

18. A low temperature thermal desalination (LTTD) system comprising:
   at least one LTTD apparatus; and
   at least one container supplying a quantity of cold water to the LTTD apparatus, wherein the at least one container is attached to at least one loop of a cable, wherein the cable is driven in a single direction.

19. The LTTD system of claim 18, wherein the at least one LTTD apparatus further comprises at least one submerged platform positioned within a body of water, wherein the at least one submerged platform is buoyantly held up from a bottom surface of the body of water, and wherein the at least one submerged platform is held below a top surface of the body of water by at least one mooring attached to the bottom surface of the body of water.

20. The LTTD system of claim 19, further comprising at least one wheel positioned proximate to a bottom surface of the body of water, wherein the at least one loop of a cable is movably connected to the at least one wheel.

* * * * *